United States Patent

Bacon

[15] 3,668,436

[45] June 6, 1972

[54] CIRCUIT APPARATUS FOR SUPPLYING FIRST AND SECOND TRAINS OF MUTUALLY EXCLUSIVE CLOCK PULSES

[72] Inventor: Stanley H. Bacon, Northridge, Calif.

[73] Assignee: Computer Design Corporation, Santa Monica, Calif.

[22] Filed: Dec. 15, 1969

[21] Appl. No.: 885,210

[52] U.S. Cl. ..............................307/262, 307/208, 307/215, 307/247 R, 307/269, 328/57, 328/62, 331/60, 331/113 R

[51] Int. Cl. ......................................H03k 1/12, H03b 25/00

[58] Field of Search..................307/208, 260, 262, 269, 247, 307/215; 328/13, 28, 29, 57, 59, 62, 63, 96, 98, 180; 331/45, 60, 113 R

[56] References Cited

UNITED STATES PATENTS 3,259,761 7/1966 Narud et al. ............................307/215
3,292,100 12/1966 Berlind ...................................331/45
3,441,751 4/1969 Benedict ..............................328/63 X
3,467,839 9/1969 Miller ................................307/215 X
3,284,645 11/1966 Eichelberger et al. .................307/215

*Primary Examiner*—Stanley D. Miller, Jr.
*Attorney*—Samuel Lindenberg and Arthur Freilich

[57] ABSTRACT

A two phase clock circuit particularly useful for driving logic circuitry whose operation requires the definition of two substantially non-overlapping clock phases. The clock circuit includes a square wave oscillator having true and complementary output terminals, each driving a different power amplifier. Each oscillator output terminal is connected to its associated power amplifier through a NOR gate. The second terminal of each NOR gate is connected to the output of the opposite power amplifier so that neither power amplifier can begin to form a clock pulse until the clock pulse formed by the other power amplifier has terminated, or in other words, until the output voltage of the other power amplifier has fallen to a defined threshold level.

4 Claims, 5 Drawing Figures

PRIOR ART

INVENTOR.
STANLEY H. BACON
BY Lindenberg & Freilich
ATTORNEYS

INVENTOR.
STANLEY H. BACON

BY Lindenberg & Freilich

ATTORNEYS

CIRCUIT APPARATUS FOR SUPPLYING FIRST AND SECOND TRAINS OF MUTUALLY EXCLUSIVE CLOCK PULSES

BACKGROUND OF THE INVENTION

This invention relates generally to electronic clock circuits and, more particularly, to a two phase clock circuit for providing trains of essentially non-overlapping first and second clock pulses.

In many digital systems employing two phase logic circuitry, it is essential that the two phases be mutually exclusive, i.e., that first phase (01) clock pulses terminate prior to second phase (02) clock pulses beginning and vice versa. In many known prior art two phase clock circuits, the cross-over point between a terminating 01 pulse and a beginning 02 pulse occurs at approximately the midpoint of the pulse amplitude transition. That is, assuming that clock pulses 01 and 02 alternately vary between a ground and a −28 volt level, the 01 pulse on its way from −28 volts to ground, will cross the midpoint (−14 volts) at substantially the same time as the 02 pulse on its way from ground to −28 volts crosses the −14 volt midpoint.

In many systems employing two phase logic, this degree of overlapping of clock pulses cannot be tolerated. Consequently, two phase clock circuits have been developed with provide trains of substantially non-overlapping first and second clock pulses by delaying the initiation of each pulse by a fixed amount selected for the worst case situation. That is, the first and second trains of clock pulses are respectively developed in response to the true and complementary outputs of a square wave oscillator. A transition in the oscillator output initiates a clock pulse after a fixed delay which must be sufficiently long to assure that the other phase clock pulse has terminated. The precise termination time of the clock pulse depends on several factors, such as temperature, load, device parameters, etc., and thus the delay must be selected to be sufficient for a worst case situation. Accordingly, in most situations the selected delay will be greater than is necessary thereby reducing the overall operating speed of the system.

SUMMARY OF THE INVENTION

Briefly,in accordance with the present invention, mutually exclusive two phase clock pulses are developed by inhibiting the initiation of one clock pulse phase until the other phase clock pulse has terminated. That is, an essentially closed loop system is provided which actually uses the termination of the clock pulse of one phase to trigger the initiation of the clock pulse of the other phase. This technique inherently compensates for variations in temperature, load, device parameters, etc.

In accordance with the preferred embodiment of the present invention, a clock circuit is provided including a square wave oscillator having true and complementary output terminals, each driving a different power amplifier. Each oscillator output terminal is connected to its associated power amplifier through a gating or coupling means. The gating or coupling means is controlled by the output of the opposite power amplifier in a manner such that as long as either power amplifier is providing a clock pulse at an active level, the gating or coupling means to the opposite power amplifier is disabled.

In the preferred embodiment of the invention, threshold means in the form of a zener diode are incorporated in the gating circuitry to precisely define the level to which one phase clock pulse must fall prior to initiating formation of the other phase clock pulse.

The novel features of the invention are set forth with particularity in the appended claims. The invention will be best understood from the following description when read in conjunction with the accompanying drawings.

DESCRIPTION OF THE PREFERRED EMBODIMENTS

Figure 1A:
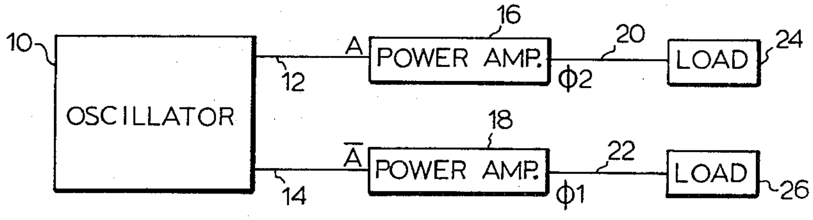
FIG. 1A is a block diagram of a typical prior art two phase clock circuit.
Figure 1B:
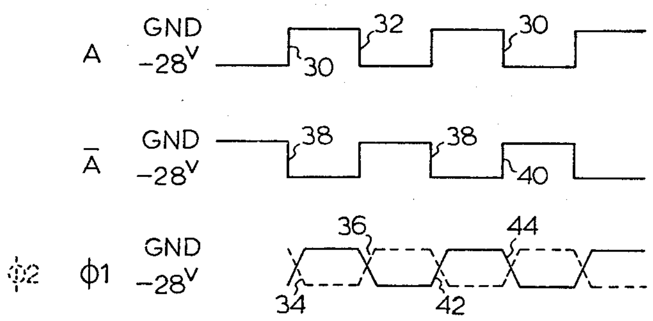
FIG. 1B illustrates exemplary waveforms occurring in the clock circuit of FIG. 1A.

Attention is now called to FIG. 1A of the drawings which illustrates a typical prior art two phase clock circuit. The clock circuit of FIG. 1A employs a square wave oscillator 10 which provides complementary timing signals A and $\overline{A}$ on output terminals 12 and 14. As shown in FIG. 1B, it has been assumed that the timing signals A and $\overline{A}$ swing between ground and a negative voltage level which will hereinafter be assumed to be −28 volts. Ground will be assumed to constitute and inactive level and −28 volts an active level.

The oscillator output terminals 12 and 14 are respectively connected to power amplifiers 16 and 18 which respectively provide clock pulse trains 02 and 01 on their output terminals 20 and 22. The output terminal 20 is connected to a load 24 which, for example, will comprise a group of logic circuits intended to be responsive to clock phase 02. On the other hand, power amplifier output terminal 22 will be connected to load 26 which will comprise a group of logic circuits intended to be active during clock phase 01.

Attention is now called to FIG. 1B which illustrates the relationships between the clock pulse trains 01 and 02 and the square wave timing signals A and $\overline{A}$ provided by oscillator 10. It will be noted that it has been assumed that the power amplifiers 16 and 18 each introduce an inversion. Thus, note that the positive and negative going signal transitions 30 and 32 of timing signal A respectively produce the negative and positive going signal transitions 34 and 36 in the clock pulse train 02. Note also that the negative and positive going transitions 38 and 40 in timing signal $\overline{A}$ respectively produce the positive and negative going transitions 42 and 44 in clock pulse train 01.

As is characteristic of such prior art two phase clock circuits, the clock pulse trains 01 and 02 shown in FIG. 1B cross each other approximately at the midpoint of the clock pulse amplitude. That is, having assumed that the clock pulses swing from approximately ground to −28 volts, it will be apparent that the clock pulses 01 and 02 are each at approximately −14 volts at the same point in time. As has been previously mentioned herein, certain two phase logic organizations can not tolerate this degree of overlapping of the clock pulses 01 and 02. In certain two phase logic systems employing metal oxide semi-conductor logic, it is essential that the clock pulses 01 and 02 be substantially mutually exclusive. That is, in such systems, it is essential that the amplitude of one phase clock pulse return to its inactive level prior to the initiation of the other phase clock pulse. More particularly, assuming, for example, that the circuits of the loads 24 and 26 are responsive to an active clock pulse level of −28 volts, it is essential that the 01 clock pulse return from −28 volts to essentially ground prior to the initiation of the transition of the 02 clock pulse from ground toward −28 volts. In order to provide such substantially non-overlapping two phase clock pulses, prior art systems have incorporated first and second delay circuits in the system of FIG. 1A between the oscillator 10 and power amplifiers 16 and 18, respectively. The delay introduced by such delay circuits must be sufficiently long to assure, for a worst case condition, that the first and second phase clock pulses do not overlap. Unfortunately, by selecting the delay for a worst case condition, it will be unnecessarily long for most conditions, thus reducing the overall system operating speed. In accordance with the present invention, no fixed delay is incorporated, but rather the initation of each clock pulse is delayed only as long as is required to permit the other phase clock pulse to terminate.

Figure 2:
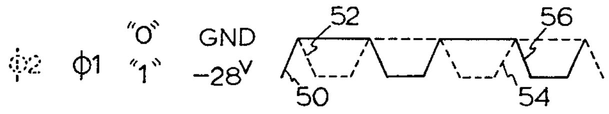
FIG. 2 illustrated non-overlapping clock pulse trains of the type produced by embodiments of the present invention.

More particularly, as is shown in FIG. 2, in accordance with the present invention, a positive going transition 50 of clock pulse 01 is initiated in response to a negative going transition 38 of timing signal $\overline{A}$. However, the negative going transition 52 of clock pulse 02 is not initiated by the positive going transition 30 of timing signal A which occurs simultaneously with the transition 38 of timing signal $\overline{A}$, but instead, the negative going transition 52 of clock pulse 02 is initiated only after clock pulse 01 has returned from −28 volts to ground level.

Figure 4:
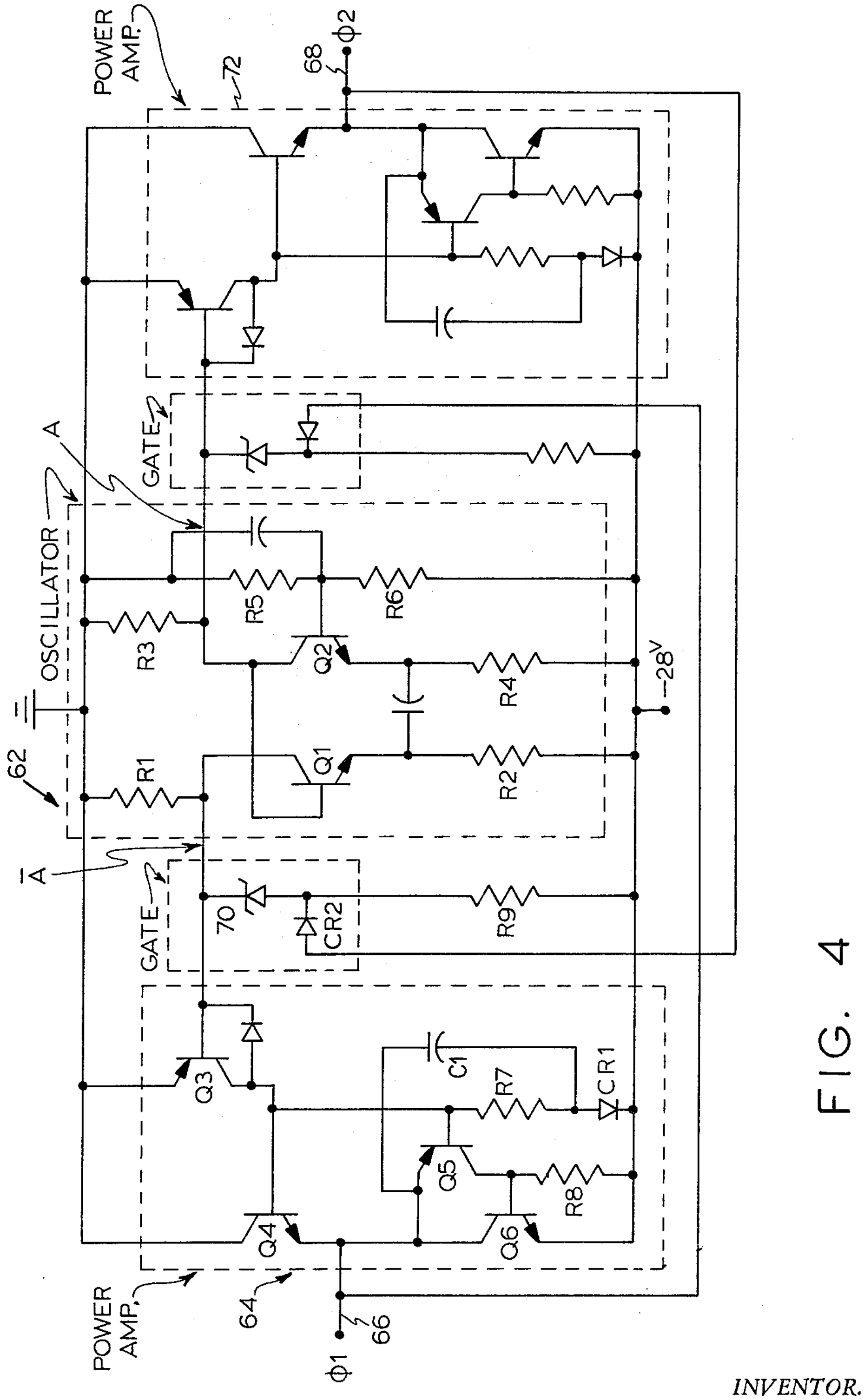
FIG. 4 is a detailed schematic diagram of an embodiment of the present invention.

As a further example, note that the positive going transition 54 of clock pulse 02 initiated in response to the negative going transition 30 of timing signal A essentially reaches the inactive ground level prior to the negative going transition 56 of clock pulse 01 being initiated. In other words, it can be seen that the negative going transitions of both clock pulses 01 and 02 are delayed until the opposite phase clock pulses are substantially terminated. As will be seen hereinafter, in accordance with the embodiment of the invention illustrated in detail in FIG. 4, the initiation of a negative going transition in the clock pulses of either phase is permitted only when the clock pulse of the other phase returns to a defined threshold value. In the embodiment of FIG. 4, the threshold value is defined at about −4 volts. Thus, a clock pulse 01 is initiated only when the level of clock pulse 02, returning from −28 volts toward ground, reaches −4 volts.

Figure 3:
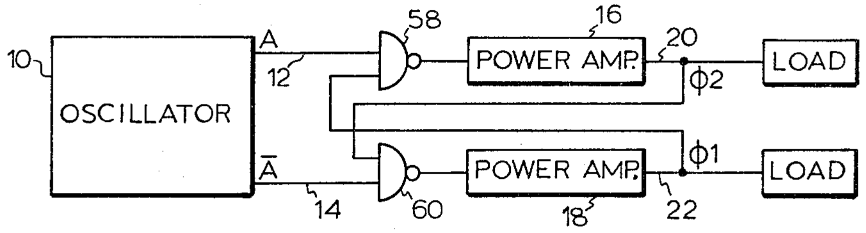
FIG. 3 is a block diagram of an embodiment of the present invention.

FIG. 3 illustrates a block diagram of an embodiment in accordance with the present invention. The embodiment of FIG. 3 differs from the conventional two phase clock circuit of FIG. 1A by the inclusion of coupling circuits or NOR-gates 58 and 60 which respectively couple the oscillator output terminals 12 and 14 to the power amplifiers 16 and 18. The output of power amplifier 18 is coupled to the input of NOR-gate 58 and the output of power amplifier 16 is coupled to the input of NOR-gate 60. As will be better understood hereinafter, as long as the output of power amplifier 16 is more negative than approximately −4 volts, gate 60 will be disabled and thus the initiation of clock pulse 01 will be inhibited. Similarly, as long as the output of power amplifier 18 is more negative than −4 volts, NOR-gate 58 will be disabled and the initiation of clock pulse 02 will be inhibited.

Attention is now called to FIG. 4 which illustrates a schematic diagram of the clock circuit illustrated in block form in FIG. 3. The circuit of FIG. 4 includes a square wave oscillator 62 comprising an emitter coupled multivibrator including first and second transistors Q1 and Q2. The collector of transistor Q2 is connected through resistor R1 to a source of relatively positive potential, illustrated as ground. The emitter of transistor Q2 is connected through resistor R2 to a source of negative potential, illustrated as −28 volts. The base of transistor Q1 is connected to the collector of transistor Q2 which is coupled through resistor R3 to ground. The emitter of transistor Q2 is connected through resistor R4 to the negative potential. A voltage divider comprised of resistors R5 and R6 is connected between the sources of positive and negative potential with the base of transistor Q2 being connected to the junction between resistors R5 and R6.

The oscillator 62 is substantially conventional and operates to provide the square wave timing signals A and $\overline{A}$ (as illustrated in FIG. 1B) at the collectors of transistors Q2 and Q1, respectively.

The collector of transistor Q1 is connected to input transistor Q3 of power amplifier 64. The emitter of transistor Q3 is connected to the source of relatively positive potential (ground) and the collector of transistor Q3 is connected through resistor R7 and diode CR1 to the source of negative potential. Transistor Q3 is connected in a current multiplying arrangement with transistor Q4. More particularly, the base of transistor Q4 is connected to the collector of transistor Q3. The collector of transistor Q4 is connected to ground. The emitter of transistor Q4 is connected to the output terminal 66 providing clock pulse train 01. Additionally, terminal 66 is connected to the emitter of transistor Q5 whose base is connected to the collector of transistor Q3. The collector of transistor Q5 is connected through resistor R8 to the source of negative potential. Transistor Q5 is connected in a current multiplying configuration with transistor Q6 whose collector is connected to the output terminal 66 and whose base is connected to the collector of transistor Q5. The emitter of transistor Q6 is connected to the source of negative potential.

In considering the operation of the power amplifier 64, first assume that transistor Q3 is forward biased. This in turn will forward bias transistor Q4 and both will supply load current through output terminal 66 which will thus be connected substantially to ground potential. It will be noted that when transistor Q3 is conducting, the base of transistor Q5 will be held high and thus transistor Q5 will be off thus also holding transistor Q6 off. During this time, capacitor C1 connected between the emitter of transistor Q5 and the anode of diode CR1 will charge to approximately −28 volts.

When transistor Q3 turns off, transistor Q4 will also turn off. Capacitor C1 will then forward bias transistor Q5 which will turn on to in turn cause transistor Q6 to conduct. Thus, transistors Q5 and Q6 will then supply the clock pulse 01 at the negative −28 volt potential.

Summarizing the operation of the power amplifier 64 therefore, it should be clear that when transistor Q3 is conducting, the output terminal 66 will be substantially at ground potential and when transistor Q3 is off, the output terminal 66 will be at approximately −28 volts. AS will be seen more clearly hereinafter, transistor Q3 will conduct unless the following two conditions are satisfied:

1. Transistor Q1 is off; and
2. The level of clock pulse 02 on terminal 68 is close to ground or at least between approximately −4 volts and ground.

More particularly, the base of transistor Q3 is connected through zener diode 70 assumed to have a rating of 3.9 volts and resistors R9 to the negative potential source. Output terminal 68 of power amplifier 72 is connected through diode CR2 to the junction between zener diode 70 and resistor R9.

When the oscillator state is such that transistor Q1 is conducting, the voltage drop across resistor R1 forward biases transistor Q3 and thus in accordance with the foregoing explanation of the operation of power amplifier 64, output terminal 66 will be substantially ground potential. When transistor Q1 stops conducting, the potential on the base of transistor Q3 will maintain transistor Q3 forward biased, as a consequence of the path through resistor R1, zener diode 70, and resistor R9 until the potential on terminal 68 swings to within 4 volts of ground potential at which time it will forward bias diode CR2 to increase the potential on the base of transistor Q3 to turn it off. As has been previously pointed out, when transistor Q3 cuts off, the potential in terminal 66 will fall to −28 volts where it will stay until oscillator transistor Q1 turns on again.

It will of course be appreciated that oscillator transistor Q2 similarly drives power amplifier 72 to yield negative 02 clock pulses on terminal 68.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Circuit apparatus for supplying first and second trains of complementary clock pulses, said apparatus comprising:

an oscillator circuit having first and second output terminals and including means for alternately providing first polarity signal transitions on said first and second output terminals;

first and second power amplifiers, each having an input terminal and an output terminal and including means providing an output signal at said output terminal at an active level in response to a first polarity signal transition applied to the input terminal thereof;

a first means coupling said oscillator circuit first output terminal to said first power amplifier input terminal, said first means including a first threshold gate means for maintaining said first power amplifier output signal at said active level subsequent to the termination of a first polarity signal transition on said oscillator circuit first output terminal;

a second means coupling said oscillator circuit second output terminal to said second power amplifier input terminal, said second means including second threshold gate means for maintaining said second power amplifier output signal at said active level subsequent to the termination of a first polarity signal transition on said oscillator circuit second output terminal;

first disabling means responsive to said second power amplifier output signal being at said active level for disabling said first threshold gate means; and second disabling means responsive to said first power amplifier output signal being at said active level for disabling said second threshold gate means.

2. The circuit apparatus of claim 1 wherein said first threshold gate means includes a first zener diode connected in series with a first resistor between said first power amplifier input terminal and a source of reference potential; and wherein said second threshold gate means includes a second zener diode connected in series with a second resistor between said second power amplifier input terminal and said source of reference potential.

3. The circuit apparatus of claim 2 wherein said first disabling means includes a first diode connected between said second power amplifier output terminal and the junction between said first zener diode and said first resistor; and wherein said second disabling means includes a second diode connected between said first power amplifier output terminal and the junction between said second zener diode and said second resistor.

4. Circuit apparatus for supplying first and second trains of complementary clock pulses, said apparatus comprising:

an oscillator including first and second transistors, each having an output electrode;

a first resistor having a first end connected to said first transistor output electrode and a second end adapted to be connected to a source of relatively positive potential;

a second resistor having a first end connected to said second transistor output electrode and a second end adapted to be connected to said source of relatively positive potential;

a first power amplifier having an output terminal and including an input transistor having a control electrode and input and output current electrodes;

a second power amplifier having an output terminal and including an input transistor having a control electrode and input and output current electrodes;

means connecting a source of potential across said input and output current electrodes of said first and second power amplifier input transistors;

means connecting said first transistor output electrode to said first power amplifier input transistor control electrodes;

means connecting said second transistor output electrode to said second power amplifier input transistor control electrode;

a first zener diode and a third resistor connected in series between said first power amplifier input transistor control electrode and said source of relatively negative potential;

a second zener diode and a fourth resistor connected in series between said second power amplifier input transistor control electrode and said source of relatively negative potential;

first diode means connecting said second power amplifier output terminal to the junction between said first zener diode and said third resistor; and second diode means connecting said first power amplifier output terminal to the junction between said second zener diode and said fourth resistor.

* * * * *